July 28, 1959

C. GRADY 2,896,328

PORTABLE DRAWING BOARD

Filed Aug. 4, 1953

INVENTOR.
Claude Grady,
BY Brown, Jackson,
Boettcher & Dienner
Attys.

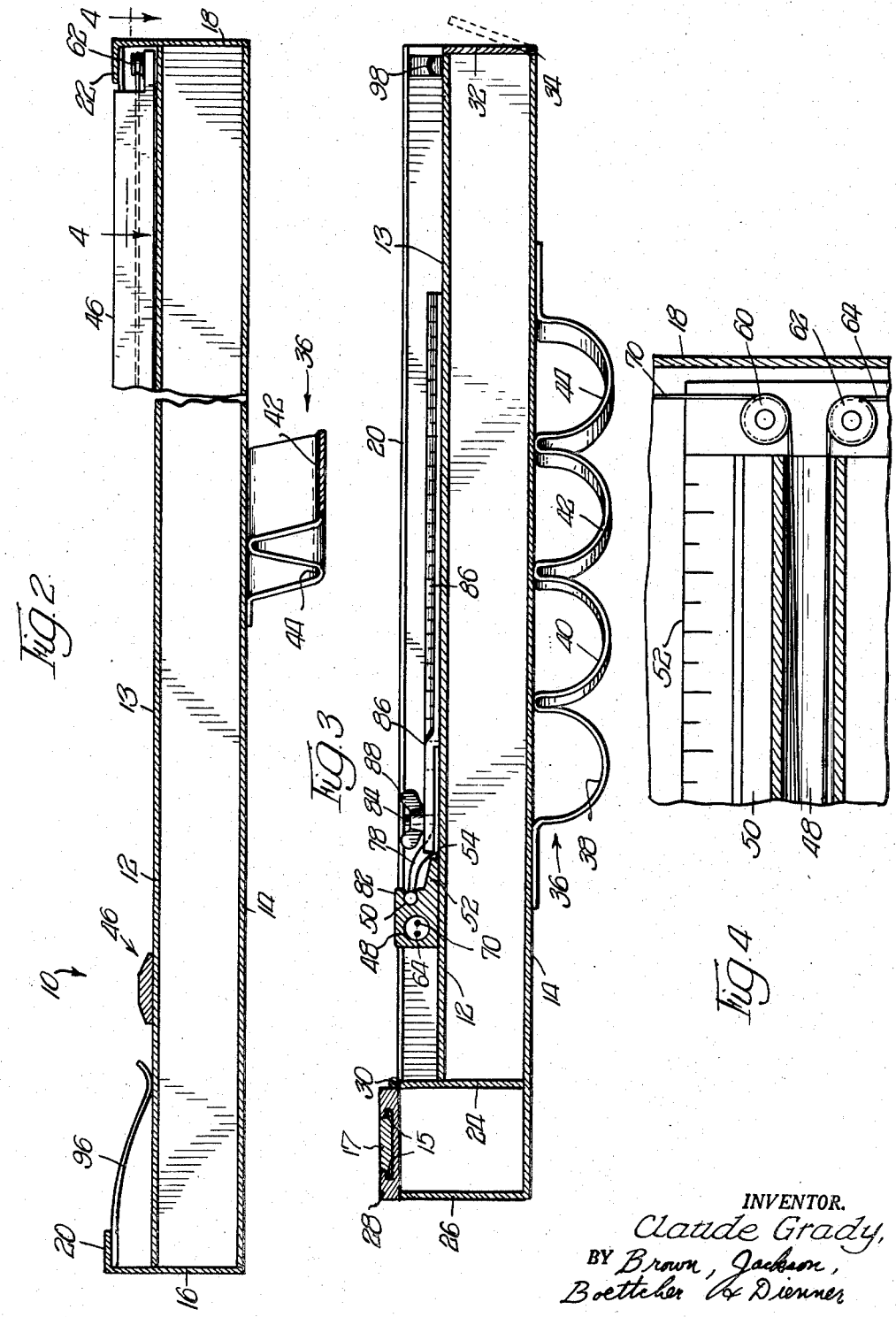

United States Patent Office 2,896,328
Patented July 28, 1959

2,896,328

PORTABLE DRAWING BOARD

Claude Grady, Evanston, Ill.

Application August 4, 1953, Serial No. 372,362

1 Claim. (Cl. 33—80)

The present invention relates to a portable drawing board which allows the operator to make accurate and complete mechanical drawings while present on the job site.

There are many situations where one engaged in construction or survey work needs to make an accurate, on the spot, drawing of outdoor projects and the like to aid in planning future work, estimating costs, material requirements, etc. Heretofore, this has been done by taking measurements, making rough sketches on a pad and then returning to an office where the notes are laid out to scale. One form of sketch or drawing board which is helpful in allowing the engineer to do fairly accurate work out in the field is the plane table, but this type of device requires an expensive instrument to operate efficiently and to be of any real value; moreover, it is unsuitable for operation in many types of work and is bulky and inconvenient to transport.

It is, therefore, an object of my invention to provide a portable drawing board which may be conveniently carried to and on the job, which provides the implements for making a complete and accurate mechanical drawing on the job, and which is relatively simple to operate.

It is a further object of my invention to provide a sketch board which may be attached to one hand of the operator, leaving the other hand free to minipulate a pencil and the other drawing implements commonly used in making mechanical drawings, or when necessary, allowing the operator to aid in making the measurements which form the basis of the desired drawing.

It is yet another object of my invention to provide a portable drawing board with novel rectilinear sliding members, comparable to the drafting room T-square and triangles, to aid in the preparation of accurate mechanical drawings in the field.

It is still another object of my invention to provide a portable drawing board having a slidable, longitudinally extending rectilinear member which is slidably retained on the drawing board.

Still another object of this invention is to provide a novel guide means comprising guide cords for maintaining said longitudinally extending rectilinear member in parallel relationship with the longitudinal axis of the board, and also to provide a guard means for protecting the guide cords.

Yet another object of my invention is to provide a portable drawing board having convenient pencil and paper receiving pockets wherein each pocket is provided with a spring biased door to retain the drawing implements in the respective pockets until the operator requires them and one of said doors comprises a slide rule for aiding in making calculations in the field.

In accordance with the present invention, I provide a portable drawing board having a hand receiving strap fixed to the under surface of said board and adjacent the center thereof, whereby the operator may hold the drawing board in one hand and manipulate the necessary drawing implements with his other hand, or aid in making measurements which are to form the basis of the desired drawing. The board is provided with a longitudinally extending rectilinear member, comparable to the drafting room T-square, which is maintained in parallel relationship with the longitudinal axis of the board by a pulley and guide cord arrangement. Guards are provided to overlie and protect the guide cords from abuse and the rectilinear member is so constructed as to aid in the protection of the guide cords. The longitudinally extending rectilinear or straight edge member is provided with a slidable transversely extending rectilinear or straight edge member, having an adjustable portion for drawing angles. The transversely extending member is comparable to the drafting room triangle, and is so mounted on the longitudinally extending member that it is maintained in a plane generally parallel to the plane of the drawing surface of the board, even though the board may be inadvertently turned upside down. I also provide convenient pockets having spring biased doors for receiving pencils, paper and other drawing implements.

In addition to the foregoing, it is an object of the present invention to provide a drawing board which is economical of manufacture, convenient to use, readily transportable, and which allows the operator to make an accurate mechanical drawing in the field or on the job site.

Other objects and advantages of the present invention will become apparent in the following description of a preferred embodiment of the drawing board of the present invention.

Now in order to acquaint those skilled in the art with the invention, I shall describe, in connection with the accompanying drawings, a preferred embodiment of the drawing board.

In the drawings:

Figure 2 is a cross-sectional view along line 2—2 of Figure 1;

Figure 3 is a cross-sectional view along line 3—3 of Figure 1; and

Figure 4 is an enlarged fragmental cross-sectional view of one end of the longitudinal rectilinear or straight edge member approximately along line 4—4 of Figure 2.

Figure 1:
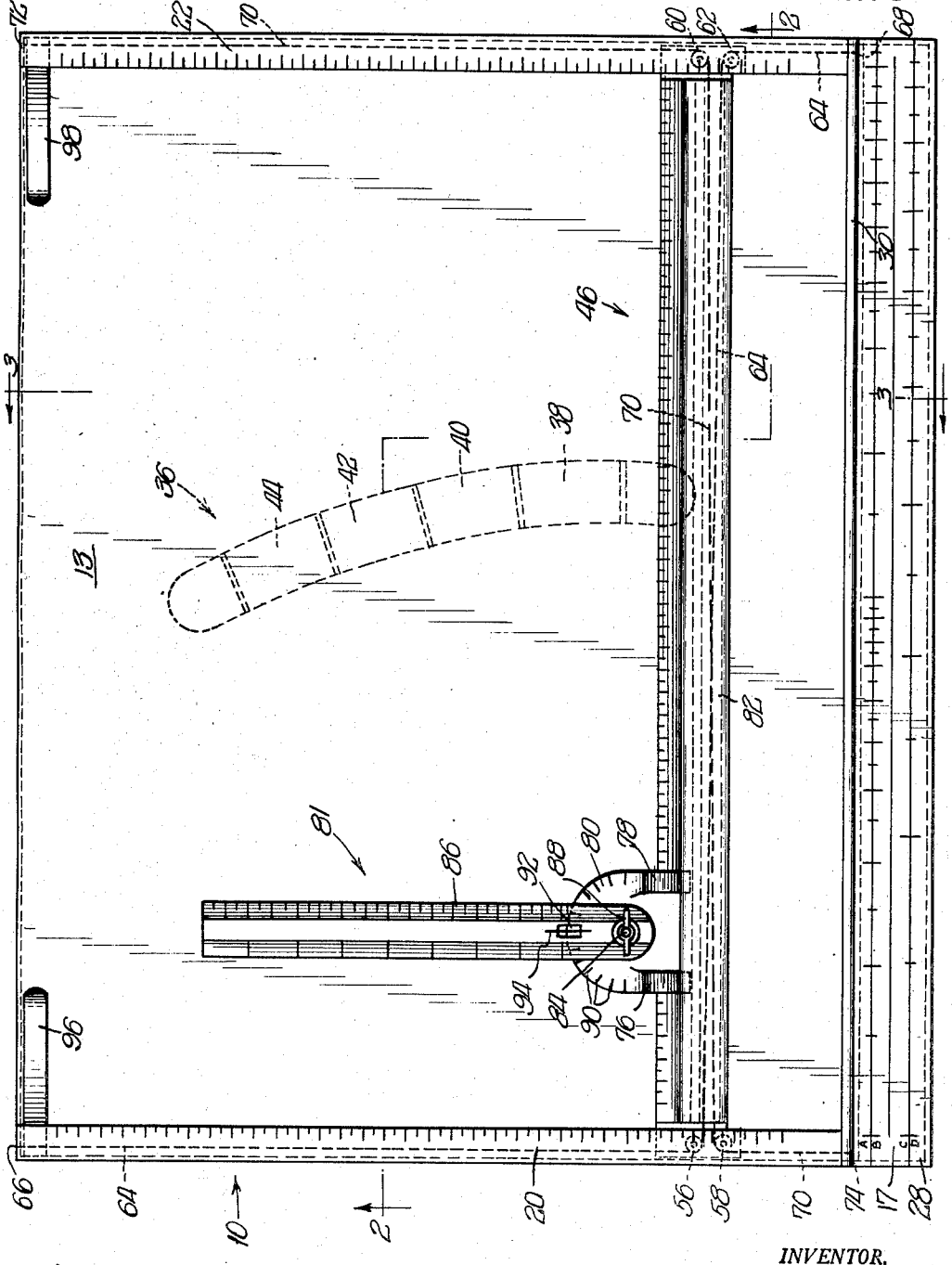
Figure 1 is a plane view of a portable drawing board comprising a preferred embodiment of my invention.

Referring now to the drawings, and more particularly to Figure 1–3, reference numeral 10 generally indicates the preferred embodiment of my portable drawing board, wherein there is provided an upper sheet or panel of rectangularly shaped material 12 and a lower sheet or panel of rectangularly shaped sheet material 14. Panels 12 and 14 may be formed out of any suitable material, such as metal, plastic or wood, but the upper surface 13 of panel or sheet 12 should be substantially plane, as it is to serve as the drawing surface. While panels or sheets 12 and 14 may be substantially square, if so desired, I have found that it is more convenient to have them in an oblong shape. As shown in Figure 3, the sheet or panel 12 is somewhat shorter in width than sheet or panel 14. The transverse edges of the two sheets are fixed in any suitable manner to the short side pieces or panels 16 and 18, the upper edges of which extend above the plane surface 13, said edges carrying throughout most of their lengths the inwardly extending angle portions 20 and 22, respectively. Panels 16 and 18 are of a length equal to the width of panel 14. A panel 24 extends between one longitudinally extending edge of upper sheet or panel 12 and the sheet or panel 14, and the angle portions 20 and 22 extend from panel 24 to the opposed longitudinal edge of the board. A sheet or panel 26 is fixed in any suitable manner to the longitudinal edge of panel or sheet 14 and the ends of panels 16 and 18, the said ends being flush with the longitudinal edge of panel 14. A door or cover 28 having a suitable spring biased hinge 30 is secured to the upwardly extending edge of panel 24 to provide a cover for the pocket formed by the panel 24, panel 26 and the portions of panels 14, 16 and 18 extending between panels 24 and 26. Preferable, the door is biased into the closed position and may be provided with a suitable notch or the like (not shown) for opening same, if so desired. Door 28, in my preferred embodiment, is conveniently formed into a slide rule. The door or cover comprises the body of the slide rule and is provided with a T-shaped slot 15 which frictionally receives the sliding T-shaped bar or slide 17. The upper or outer surfaces of the cover or door 28 and member 17 are provided with the usual slide rule indicia, such as that shown in Figure 1, whereby the operator can readily make such mathematical calculations as will be necessary, as for instance, multiplication, division, and finding square roots. A suitable sliding indicator, carrying an indicateing line, may be provided, if so desired, to aid in making more accurate readings.

A door or cover 32 is mounted on the opposite longitudinally extending edges of panel or sheet 12 by the spring biased hinge 34, and acts as a cover for the pocket formed by the space bounded by door 32, panel 24, panel 14, side panel 16 and side panel 18. Preferably, door or cover 32 is biased toward the closed position, and, as in the case of door 28, may be provided with a suitable notch or the like (not shown) for opening same.

Secured to the bottom of the drawing board is the hand receiving strap 36. The strap 36 may be of such form that it provides a single loop to go over the back of the hand, or it may provide a series of loops for receiving the fingers and thumb of the supporting hand or the fingers alone. The strap may be secured to the lower surface of the board in any suitable manner, but should be so located on the bottom that when the hand is received in the strap, the palm of the hand is under the center of the board so that the board may be properly supported both for carrying the board about while taking measurements, and for making of drawings anywhere upon the drawing surface of the board. In the present embodiment, the strap 36 is so secured to the lower surface of panel 14 that it provides four finger receiving loops 38, 40, 42 and 44, and is located with respect to the center of the board approximately as shown in Figure 1. The strap holds the board to the palm of the hand so that the hand can support the board against tilting or turning in any direction. Yet the board can be freely moved to and firmly held in a great variety of positions and angles by virtue of the free motion of the arm and the universal motion of the wrist. The strap may be leather or plastic, or any suitable material which will perform the desired function. Manifestly, its position shown in Figure 1 is for right handed people, and said position will be reversed for left handed people.

Slidably mounted on the drawing surface of the drawing board is the rectilinear, longitudinally extending member 46, which is comparable to the drafting room T-square. Member 46 of the present embodiment comprises a relatively narrow elongate rigid member, which may be formed of any suitable material, and which is formed with a conduit 48 and an internally enlarged groove 50, both of which extend the length of the member 46. Member 46 also provided with a relatively narrow projecting portion 52 which extends the length thereof, which portion 52 is formed with the straight edge or rectilinear surface 54. The rectilinear member 46 extends between the upwardly projecting portions of the side panels 16 and 18, and, as more particularly in Figure 2, the angle portions 20 and 22 provide, with the said upwardly projecting portions, guide ways in which the ends of member 46 slide.

Each end of the rectilinear member 46 is provided with a right angle notch and rotatably mounts the small grooved pulleys 56, 58, 60 and 62 in the respective positions shown. A first guide cord 64 has one end thereof fixed to the sketch board as at 66, engages the groove in pulley 56, passes through conduit 48 in member 46, engages the groove in pulley 62, and has the other end thereof fixed to the board at 68. A second guide cord 70 is fixed at one end thereof to the board as at 72, engages the groove in pulley 60, passes through the conduit 48 in rectilinear member 46, engages the pulley 58, and is fixed at the other end to the drawing board as at 74. As so arranged, the guide cords 64 and 70, in cooperation with the small grooved pulleys, allow the rectilinear member 46 to slide over the drawing surface of the drawing board, but maintain the rectilinear member in parallel relationship with the longitudinally extending axis of the board. In the present embodiment, this means that the drawing edge 54 will be parallel to the drawing surface 13, but the points 66, 68, 72 and 74 may be located directly on the drawing surface if so desired.

Slidably carried in the groove 50 are the enlarged ends of arms 76 and 78, which are integral with a flat plate or protractor member 80. It is to be noted that the restricted opening of the groove 50 provides shoulders 82 which slidably engage the neck portion of arms 76 and 78 and prevent any great movement of the protractor member with respect to rectilinear member 46. The protractor member carries a screw threaded stud 84 which receives the rectilinear member 86; the wing nut 88 cooperates with stud 84 to hold the member in any one of a number of desired angular positions with respect to the edge 54 of member 46. The protractor member 80 is provided with the usual indicia 90 for measuring off angles, and the member 86 is formed with an eye or peep hole 92, and axial line 94, whch is divided by the eye 92 for correctly setting the rectilinear member 86 at the desired angle. The member 86 and protractor member 80 comprise a generally transversely extending rectilinear member 81, and said member is comparable to the drafting room triangles. By fixing the rectilinear member with respect to the protractor member so that line 94 coincides with 90 degree angle position on the protractor member, lines perpendicular to the drawing edge 54 may be drawn. Similarly, by adjusting the member 86 with respect to the protractor at one of the other angular positions indicated by the scale on the protractor member, lines inclined to the drawing edge 54 may be drawn.

The paper upon which it is desired to make sketches is inserted in the open ends of the guide ways and under suitable spring clip arms 96 and 98, which hold the paper in place. In Figure 1, the open ends of the ways are at the top longitudinal edge of the board. Rectilinear member 46 may be moved slightly upwardly from surface B, so that the sheet of paper may pass thereunder. Clips 96 and 98 may be of any suitable shape and design and secured in any suitable manner to the board, though I have shown them secured to the lower surface of angle portions 20 and 22 respectively.

For convenience of the drawing board operator, pencils, erasers, and the like may be kept in the pocket covered by door 28 and a pad of paper may be kept in the pocket covered by door 32. Since the doors are resiliently retained in closed position by their spring hinges, the pencils, erasers, paper, etc. are kept within the respective pockets until they are required, without fear that they will fall out as the board is being carried about before and/or during use.

It will be noted that my sketch board is especially adapted for transportation, both to the site of the job, and on the job, when the sketches are being made. For instance, the protractor member 80 and the rectilinear member 86 are maintained in a plane substantially parallel to the plane of drawing surface 13 regardless of the angle to which the board may be tilted during the transportation thereof to the job, or while the operator aids in taking measurements. This result is by reason of the action of shoulders 82 on the necks of arms 76 and 78, and the tendency of portions 20 and 22 acting to prevent more than a small amount upward movement of member 46 with respect to drawing surface 13. Moreover, the angle portions 20 and 22 and the conduit 48 in rectilinear member 46 comprise guard means for the guide cords and protect the cords from the undue wear and tear often encountered in the field. The guard means insure that the guide cords will not become entangled with foreign objects and will not become worn by constant contact with hard objects during transportation and handling by the operator. It should also be apparent that the spring biased pocket covers 28 and 32 will retain the drawing implements in the respective pockets even though the board may be tilted upside down, and since slide 17 is frictionally retained within the T-shaped slot 15, said slide will not move in said slot unless pushed or pulled by the operator.

In my preferred embodiment, I employ the measuring indicia shown on the upper surfaces of the angle portions 20 and 22, and the upper surface of portion 52 of rectilinear member 46 to aid in laying off the sketches to scale. As shown in Figure 1, the scales laid off on the upper surfaces of angle portions 20 and 22 are identical and start from the same respective points, while the upper surface of portion 52 has the same scale units laid off on it. Any measuring units may be employed so long as they are consistently used, but in my preferred embodiment I prefer to use one quarter inch and one eighth inch indicia lines.

It is believed that the manner of using my portable drawing board will be obvious to one skilled in the art. After the board is placed on the operator's hand and the paper is inserted in place, horizontal lines may be drawn by moving the rectilinear member 46 to the desired location with the free hand. Vertical lines may be drawn by fixing the rectilinear member 86 in position shown in Figure 1 and sliding the protractor member and the mmeber 86, which act together to comprise a transversely extending rectilinear member 81, to the desired position. Thus, the operator holds the board in one hand and uses his other to manipulate his pencil and the various rectilinear members. Where curved lines are desired, the operator may substitute for member 86 a member having suitable curved edges in addition to or without the straight edges formed on member 86, or he may carry a suitable curve guide device in one of the board pockets. The slide rule may be used for conveniently computing areas or the like in the field when this becomes necessary.

The foregoing description and the drawings are given merely to explain and illustrate my invention, and the manner in which it may be utilized, and the invention is not to be limited thereto, except insofar as the appended claim is so limited, since those skilled in the art who have my disclosure before them will be able to make modifications and variations therein without departing from the scope of the invention.

I claim:

In combination, drawing board means having front and back faces, the front face presenting a planar working surface for backing a sheet of drawing paper, means permanently attached to said drawing board means and extending over a part of the front face for releasably holding a sheet of drawing paper to the planar surface of said drawing board means said means comprising spring holding means adjacent the upper edge of the board for holding the sheet in register with the board and for holding the upper part of the sheet from falling away from the board in any position thereof, finger strap means secured to the back of said drawing board means for receiving a plurality of fingers of one hand of an operator whereby said drawing board means may be held in drawing position and may also be freely carried on the said one hand of the operator both while a drawing is being made on a sheet of drawing paper with a drawing instrument held in the other hand of the operator and while the supporting hand is moved about, said drawing board means including pocket means closable and openable by one hand disposed adjacent one edge of the working surface for receiving and storing a drawing instrument, primary rule means operatively connected at its ends with said drawing board means and slidably adjustable by motion of translation over the planar working surface of the latter, secondary rule means operatively connected at one end with said primary rule means and rectilinearly and pivotally adjustable relative to the latter over the planar working surface of said drawing board means, said primary and secondary rule means overlying said sheet and preventing the lower part of the sheet from falling away from said board in any position thereof, the connections of said primary rule means with said drawing board means and the connection of said secondary rule means with said primary rule means serving to maintain both said rule means flat on said planar surface in any preselected adjusted positons with respect to said drawing board means irrespective of the spacial position of the latter, said primary rule means having rectilinear guiding means facilitating the drawing of straight lines transversely of said drawing board means and parallel to each other and said secondary rule means having angular and rectilinear guiding means facilitating the drawing of straight lines at any angle to the transverse lines, and said primary and secondary rule means being adjustable by the said other hand of the operator while said drawing board means is supported on the said one hand of the operator.

References Cited in the file of this patent

UNITED STATES PATENTS

| | | |
|---|---|---|
| 327,759 | Boyle | Oct. 6, 1885 |
| 386,072 | Huyett | July 10, 1888 |
| 550,302 | Thompson | Nov. 26, 1895 |
| 607,814 | Aigner | July 26, 1898 |
| 622,640 | Shimoneck | Apr. 4, 1899 |
| 1,185,439 | Sampson | May 30, 1916 |
| 1,323,081 | Marston | Nov. 25, 1919 |
| 1,436,415 | Sullivan et al. | Nov. 21, 1922 |
| 1,482,606 | Goldrick | Feb. 5, 1924 |
| 1,593,166 | Flach | July 20, 1926 |
| 2,003,841 | Sorenson | June 4, 1935 |
| 2,424,840 | Murphy | July 29, 1947 |
| 2,589,320 | Allenbrook | Mar. 18, 1952 |
| 2,632,683 | Sterling | Mar. 24, 1953 |

FOREIGN PATENTS

| | | |
|---|---|---|
| 64,723 | Switzerland | April 11, 1913 |
| 7,288 | Great Britain | 1889 |